(12) United States Patent
Ji et al.

(10) Patent No.: US 8,409,769 B2
(45) Date of Patent: Apr. 2, 2013

(54) GAS DIFFUSION LAYER FOR FUEL CELL

(75) Inventors: Chunxin Ji, Pennfield, NY (US);
Jeanette E. Owejan, Honeoye, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1432 days.

(21) Appl. No.: 11/952,491

(22) Filed: Dec. 7, 2007

(65) Prior Publication Data

US 2009/0148726 A1 Jun. 11, 2009

(51) Int. Cl.
- *H01M 8/10* (2006.01)
- *H01M 4/02* (2006.01)
- *H01M 4/36* (2006.01)

(52) U.S. Cl. .................... 429/530; 429/481; 429/523

(58) Field of Classification Search ........... 429/523–535
See application file for complete search history.

(56) References Cited

U.S. PATENT DOCUMENTS

| | | | |
|---|---|---|---|
| 3,985,578 A | 10/1976 | Witherspoon et al. | |
| 5,272,017 A | 12/1993 | Swathirajan et al. | |
| 5,624,769 A | 4/1997 | Li et al. | |
| 5,776,624 A | 7/1998 | Neutzler | |
| 6,277,513 B1 | 8/2001 | Swathirajan et al. | |
| 6,350,539 B1 | 2/2002 | Wood, III et al. | |
| 6,372,376 B1 | 4/2002 | Fronk et al. | |
| 6,521,381 B1 | 2/2003 | Vyas et al. | |
| 6,524,736 B1 | 2/2003 | Sompalli et al. | |
| 6,566,004 B1 | 5/2003 | Fly et al. | |
| 6,663,994 B1 | 12/2003 | Fly et al. | |
| 6,793,544 B2 | 9/2004 | Brady et al. | |
| 6,794,068 B2 | 9/2004 | Rapaport et al. | |
| 6,811,918 B2 | 11/2004 | Blunk et al. | |
| 6,824,909 B2 | 11/2004 | Mathias et al. | |
| 7,056,613 B2 | 6/2006 | Bai | |
| 2002/0090543 A1 | 7/2002 | Okamoto | |
| 2005/0026012 A1 | 2/2005 | O'Hara | |
| 2005/0026018 A1 | 2/2005 | O'Hara et al. | |
| 2005/0026523 A1 | 2/2005 | O'Hara et al. | |
| 2007/0087120 A1 | 4/2007 | Connors, Jr. et al. | |
| 2007/0218346 A1 | 9/2007 | Ji et al. | |
| 2008/0050643 A1* | 2/2008 | Abd Elhamid et al. | 429/44 |
| 2009/0061710 A1* | 3/2009 | Helmbold et al. | 442/181 |
| 2010/0329775 A1 | 12/2010 | Blanding | |

FOREIGN PATENT DOCUMENTS

WO WO2006119825 * 11/2006

* cited by examiner

*Primary Examiner* — Barbara Gilliam
*Assistant Examiner* — Steven Scully
(74) *Attorney, Agent, or Firm* — John A. Miller; Miller IP Group, PLC

(57) ABSTRACT

A gas diffusion layer for a fuel cell is described. The gas diffusion layer includes a carbon fiber mat having a substantially open structure. Bloomed fibrillated acrylic pulp is added into a microporous layer ink. Alternatively, the bloomed fibrillated acrylic pulp can first be disposed on the carbon fiber mat, with the microporous layer ink added thereafter. When the microporous layer ink/bloomed fibrillated acrylic pulp mixture is coated on the carbon fiber mat, the ink penetrates through the open substrate, and is locked into place by the bloomed acrylic pulp fibers. This allows for a buildup of microporous layer ink on top of the substrate for added thickness when the bloomed fibrillated acrylic pulp sits on top of the mat.

36 Claims, 4 Drawing Sheets

GAS DIFFUSION LAYER FOR FUEL CELL

BACKGROUND OF THE INVENTION

1. Field of the Invention

The present invention relates generally to fuel cell systems, and more particularly to a new and improved gas diffusion layers for use in Proton Exchange Membrane (PEM) fuel cell systems.

2. Discussion of the Related Art

Fuel cells have been used as a power source in many applications. For example, fuel cells have been proposed for use in electrical vehicular power plants to replace internal combustion engines. In PEM-type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive solid polymer electrolyte membrane having the anode catalyst on one of its faces and the cathode catalyst on the opposite face. The MEA is sandwiched between a pair of electrically conductive elements, sometimes referred to as the gas diffusion media components, that: (1) serve as current collectors for the anode and cathode; (2) contain appropriate openings therein for distributing the fuel cell's gaseous reactants over the surfaces of the respective anode and cathode catalysts; (3) remove product water vapor or liquid water from electrode to flow field channels; (4) are thermally conductive for heat rejection; and (5) have mechanical strength. The term fuel cell is typically used to refer to either a single cell or a plurality of cells (e.g., a stack) depending on the context. A plurality of individual cells are commonly bundled together to form a fuel cell stack and are commonly arranged in series. Each cell within the stack comprises the MEA described earlier, and each such MEA provides its increment of voltage.

In PEM fuel cells, hydrogen ($H_2$) is the anode reactant (i.e., fuel) and oxygen is the cathode reactant (i.e., oxidant). The oxygen can be either a pure form ($O_2$), or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and mixed with a proton conductive resin. The catalytic particles are typically costly precious metal particles. These membrane electrode assemblies are relatively expensive to manufacture and require certain conditions, including proper water management and humidification, and control of catalyst fouling constituents such as carbon monoxide (CO), for effective operation.

Examples of technology related to PEM and other related types of fuel cell systems can be found with reference to commonly-assigned U.S. Pat. No. 3,985,578 to Witherspoon et al.; U.S. Pat. No. 5,272,017 to Swathirajan et al.; U.S. Pat. No. 5,624,769 to Li et al.; U.S. Pat. No. 5,776,624 to Neutzler; U.S. Pat. No. 6,277,513 to Swathirajan et al.; U.S. Pat. No. 6,350,539 to Woods, III et al.; U.S. Pat. No. 6,372,376 to Fronk et al.; U.S. Pat. No. 6,521,381 to Vyas et al.; U.S. Pat. No. 6,524,736 to Sompalli et al.; U.S. Pat. No. 6,566,004 to Fly et al.; U.S. Pat. No. 6,663,994 to Fly et al.; U.S. Pat. No. 6,793,544 to Brady et al.; U.S. Pat. No. 6,794,068 to Rapaport et al.; U.S. Pat. No. 6,811,918 to Blunk et al.; U.S. Pat. No. 6,824,909 to Mathias et al.; U.S. Patent Application Publication Nos. 2005/0026012 to O'Hara; 2005/0026018 to O'Hara et al.; and 2005/0026523 to O'Hara et al., the entire specifications of all of which are expressly incorporated herein by reference.

The gas diffusion media component of a PEM fuel cell is typically comprised of a non-woven carbon fiber paper, e.g., those available from Toray Industries, Inc. (Tokyo, Japan), or a woven carbon cloth, e.g., those available from Zoltek Corporation (St. Louis, Mo.) under the PANEX trade name. Upon arrival at the PEM fuel cell manufacturer, the as-is product is typically post treated in order to render the material hydrophobic. Additionally, it has become more common practice to apply a microlayer ink (sometimes referred to as a microporous layer (MPL)) to the gas diffusion layer (GDL) for more effective water management properties.

The gas diffusion media component of the fuel cell has many functions to fulfill in order to operate successfully in a PEM fuel cell. For example, the primary tasks of the gas diffusion media component include: (1) acting a diffuser for reactant gases traveling to the electrode; (2) transporting product water to the flow field; and (3) conducting electron and transferring heat generated at MEA to the coolant.

Along with the above requirements, automotive application requirements typically demand more of the gas diffusion media component, of which the following are included: (1) protect the MEA from damage from the bipolar plates during compression; (2) freeze compatibility; and (3) durability for thousands of hours under compression.

As previously noted, conventional GDLs are typically composed of non-woven carbon fiber paper or carbon cloth with an MPL coating thereon. The MPL is a carbon black/fluorinated polymer matrix that is coating by ink onto the gas diffusion media substrate. It is believed that the microporous layer is responsible for most of the water management of the substrate/layer package. In addition, the MPL behaves as a buffer to reduce some of the high stress spots on MEA during stack compression because it is composed of fine carbon and PTFE particles. Even though good performance has been achieved with GDLs in this configuration, there are still several unresolved issues.

First, because of the nature of non-woven carbon fiber paper and carbon cloth (fiber overlay and resin binder hard spots), there are generally high stress spots imposed on the MEA during stack compression, even with MPL coating as a buffer, which is believed to be one of the causes of MEA failures.

Second, the high porosity nature of carbon fiber paper or cloth may trap water after the stack shuts down, which is typically hard to be removed through a quick purge. This can cause freeze related damage.

Third, de-lamination is another serious issue for the MPL coating carbon fiber paper or cloth. The fluorinated polymer in the MPL serves as a binder as well as a hydrophobic agent. Intrinsically, the adhesion of this layer is less than desired due to the nature of the material. Rubbing/washing off of this layer during the build or operation phases of the running cell jeopardizes durability. Furthermore, good adhesion is required for consistently high current operation and freeze capability of the cell.

CARBEL®, a gas diffusion media product, readily commercially available from W. L. Gore & Associates, Inc. (Newark, Del.), can be considered as a "stand-alone" MPL-like material, which is essentially a carbon powder filled expanded PTFE film. CARBEL® cannot typically be used alone because it lacks the stiffness required to support the MEA, especially over the gas flow channel regions. However, the fuel cell performance using simply laminated CARBEL®, carbon fiber paper or cloth is not as good as the MPL coated carbon fiber paper or cloth. In other words, CARBEL® does not fulfill the required water management needs, especially under very wet conditions.

Accordingly, there exists a need for new and improved gas diffusion layers for gas diffusion media components of PEM fuel cell systems, especially those that include an independent or stand-alone MPL which can handle the water management requirements, generate substantially uniform compression over the MEA, and still maintain acceptable carbon fiber paper like mechanical properties.

SUMMARY OF THE INVENTION

In accordance with the general teachings of the present invention, new and improved gas diffusion layers for gas diffusion media components of PEM fuel cell systems are provided.

More specifically, the present invention serves to improve the properties of GDLs in that it provides an independent or stand-alone MPL which can handle the water management requirements, can generate substantially uniform compression over the MEA, and can maintain acceptable mechanical property requirements.

In accordance with a first embodiment of the present invention, a method for forming a gas diffusion layer for use in fuel cells is provided, comprising: (1) providing a fibrous mat having a plurality of interstices formed in a surface thereof; (2) providing a plurality of pulp fibers; (3) causing the plurality of pulp fibers to bloom; (4) providing a microporous layer; (5) combining the plurality of bloomed pulp fibers and the microporous layer to form a mixture; and (6) disposing the mixture on the fibrous mat, wherein the pulp fibers are operable to penetrate the plurality of interstices and adhere to the fibrous mat, wherein the microporous layer is held in place by the plurality of pulp fibers.

In accordance with a first alternative embodiment of the present invention, a method for forming a gas diffusion layer for use in fuel cells is provided, comprising: (1) providing a fibrous mat having a plurality of interstices formed in a surface thereof; (2) providing a plurality of pulp fibers; (3) disposing the pulp fibers on the fibrous mat, wherein the plurality of pulp fibers are caused to bloom prior to disposition on the fibrous mat, wherein the pulp fibers are operable to penetrate the plurality of interstices and adhere to the fibrous mat; and (4) providing a microporous layer disposed on the fibrous mat, wherein the microporous layer is held in place by the plurality of pulp fibers.

In accordance with a second alternative embodiment of the present invention, a gas diffusion layer for use in fuel cells is provided, comprising: (1) a low areal weight fibrous mat; (2) a plurality of pulp fibers disposed on the fibrous mat, wherein the pulp fibers are caused to bloom prior to being disposed on the fibrous mat; and (3) a microporous layer disposed on the fibrous mat, wherein the microporous layer is held in place by the plurality of pulp fibers.

In accordance with a third alternative embodiment of the present invention, a gas diffusion layer for use in fuel cells is provided, comprising: (1) a low areal weight fibrous mat, wherein the fibrous mat includes a plurality of interstices formed in a surface thereof; (2) a plurality of pulp fibers disposed on the fibrous mat, wherein the pulp fibers are caused to bloom prior to being disposed on the fibrous mat, wherein the pulp fibers are operable to penetrate the plurality of interstices and adhere to the fibrous mat; and (3) a microporous layer disposed on the fibrous mat, wherein the microporous layer is held in place by the plurality of pulp fibers, wherein the microporous layer is comprised of an ink composition.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EMBODIMENTS

The following description of the preferred is merely exemplary in nature and is in no way intended to limit the invention, its application, or uses.

The present invention provides a GDL with a relatively thin (e.g., about 150 um total) package. In accordance with one aspect of the present invention, a relatively low areal weight carbon (or other suitable material such as but not limited to electroconductive fibrillated materials, screens, and/or the like) fiber mat (e.g., equal to or less than about 20 g/m$^2$), which has a substantially open structure, was chosen as the substrate. By "open structure," as that phrase is used herein, it is meant a plurality of interstices, openings, voids, apertures, holes, and/or the like formed in the mat. It should also be appreciated that the areal weight of the fiber mat can be greater than 20 g/m$^2$, depending on the material employed.

Figure 1:
FIG. 1 is a photomicrographic view of bloomed fibrillated acrylic pulp fibers, in accordance with the prior art.

By way of a non-limiting example, fibrillated pulp materials, such as but not limited to fibrillated acrylic pulp fibers, are then dispersed in a liquid (e.g., water) and made to bloom, as shown in FIG. 1. The bloomed fibrillated acrylic pulp fibers are then added into a microporous layer ink. "Acrylic pulp," as that phrase is used herein, is meant to include a bundle of substantially fine acrylic fibers (e.g., a couple hundred nanometers in diameter). When added into water, these pulps will "bloom," as previously noted.

In accordance with another aspect of the present invention, the bloomed fibrillated acrylic pulp fibers can first be disposed on the carbon fiber mat, i.e., prior to combining them with the microporous layer ink. The microporous layer ink can then be disposed on the bloomed fibrillated acrylic pulp fibers and carbon fiber mat, wherein the microporous layer ink adheres to the bloomed fibrillated acrylic pulp fibers and carbon fiber mat. The bloomed fibrillated acrylic pulp fibers aids in holding the microporous layer ink in place.

When the MPL ink (e.g., a carbon black (or graphite particle, flake, nanofibers and/or the like) and fluoropolymer (e.g., PTFE, HFP, PVDF and/or the like) with the acrylic pulp was coated on the carbon fiber mat, the ink penetrated through the open substrate, but was locked into place by the acrylic pulp fibers. The intimate mixture of the pulp in the ink allows for additional support of the ink by the pulp, effectively adding a more substrate-like feature to the overall GDL. This allows for a buildup of MPL ink on top of the substrate for added thickness when the pulp sits on top of the mat. The entire structure has an intimate interface due to the openness of the mat and the penetration of the MPL in both the pulp and mat. The acrylic pulps supposedly decompose at temperatures above 220° C. However, with properly selected post-curing temperatures, these acrylic fibers can be fused and still maintain the integrity of the GDL layer.

Because a relatively low areal weight carbon fiber mat was selected, and the intimate mixture of MPL/pulp inter-disposed therein and on top of the mat, the high stress spots imposed on the MEA during stack compression are not present. Thus, the overall structure is more homogenous and composite compared to conventional GDL/MPL structures known in the art. An illustrative example of preparing a GDL in accordance with the general teachings of the present invention is presented in the Example, below:

EXAMPLE

Fibrillated acrylic pulps CFF 111-3 (Sterling Fibers, Inc., Pace, Fla.) are dispersed in de-ionized water, isopropyl alcohol, and a small quantity of the surfactant Triton X 100 by a rotor stator at a rate of 9 k rpm for 5 min. An appropriate amount of acetylene black carbon is added and sheared for an additional 10 minutes at 11 krpm. Upon dispersion, Du Pont T-30 (or appropriate fluoropolymer) and a pH adjustor (ammonium carbonate) is added. The resulting ink is shaken by hand and knife coated onto a low areal weight carbon fiber mat (Hollingsworth and Vose Corp, Hawkinsville, Ga.), an example being product Number 8000019, having a basis weight of about 11.9 g/m$^2$ and a veil thickness of about 4.4 mil. The GDL was then heat treated as a curing process for the acrylic pulp. The treatment included a 1 hour soak at 184° C., followed by a 260° C. soak for 1 hour. The GDL was then soaked at 380° C. for 30 minutes.

Figure 2:
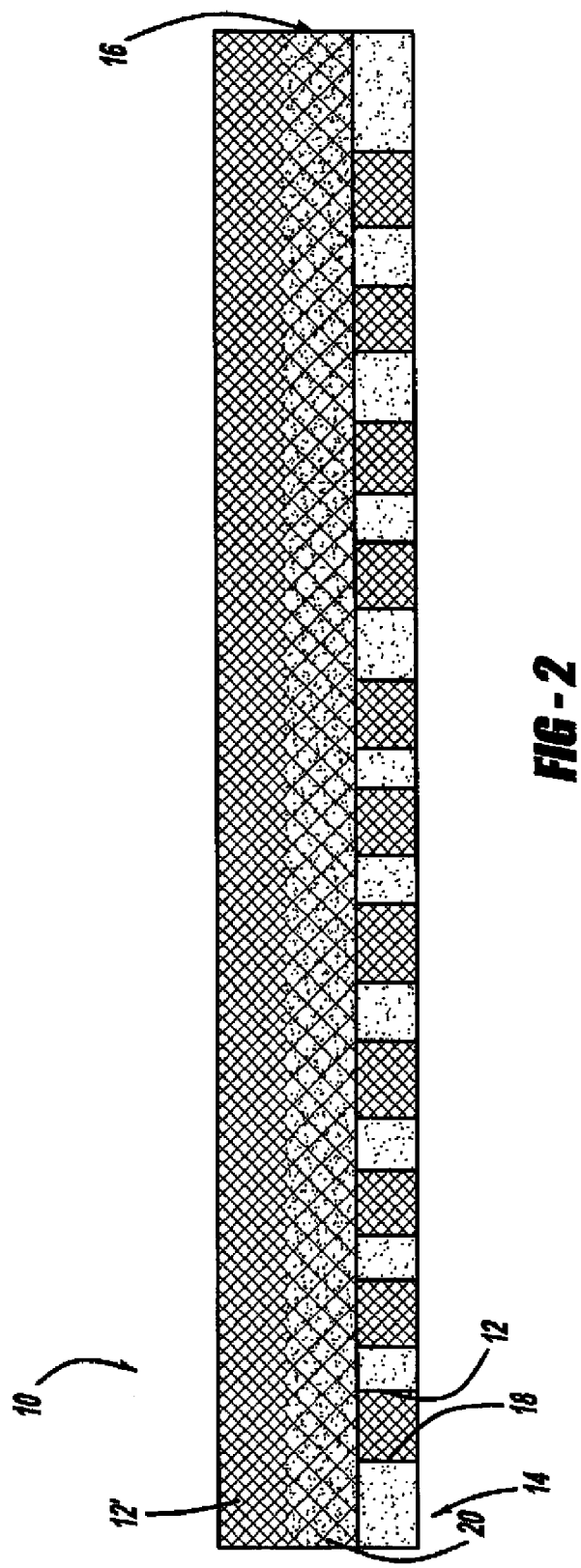
FIG. 2 is a schematic view of a gas diffusion layer, in accordance with the general teachings of the present invention.

Referring to FIG. 2, the resulting GDL formed in accordance with the Example is shown schematically generally at 10. As FIG. 2 illustrates, the acrylic fibers 12 (e.g., bloomed fibrillated acrylic pulp) fasten to the substrate 14 (e.g., a low areal weight fiber carbon mat), thus anchoring the MPL 16 to the substrate 14. In this view, the acrylic fibers 12 (and any ink attached thereto) are operable to penetrate into the interstices 18 of the substrate 14, thus providing at least a part of the anchoring function. Additionally, the acrylic fibers 12' (and any ink attached thereto) are operable to be built up on top of the substrate 14, thus increasing the overall potential thickness of the MPL 16, consisting here of a combination 20 of the acrylic fibers and ink.

Figure 3:
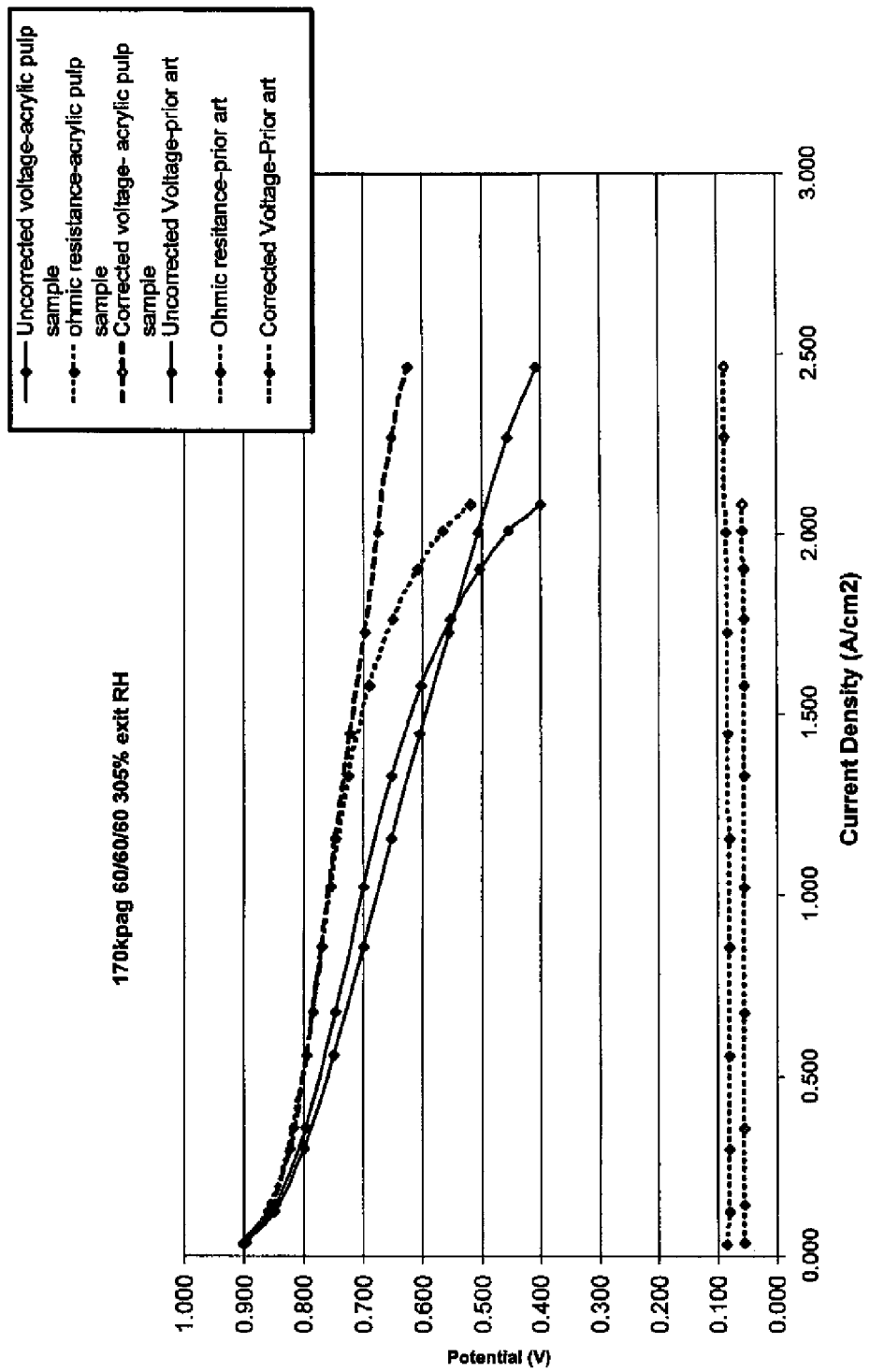
FIG. 3 is a graphical view of the potential versus current density characteristics under relatively wet conditions of a fuel cell sample containing a gas diffusion layer produced in accordance with the general teachings of the present invention.
Figure 4:
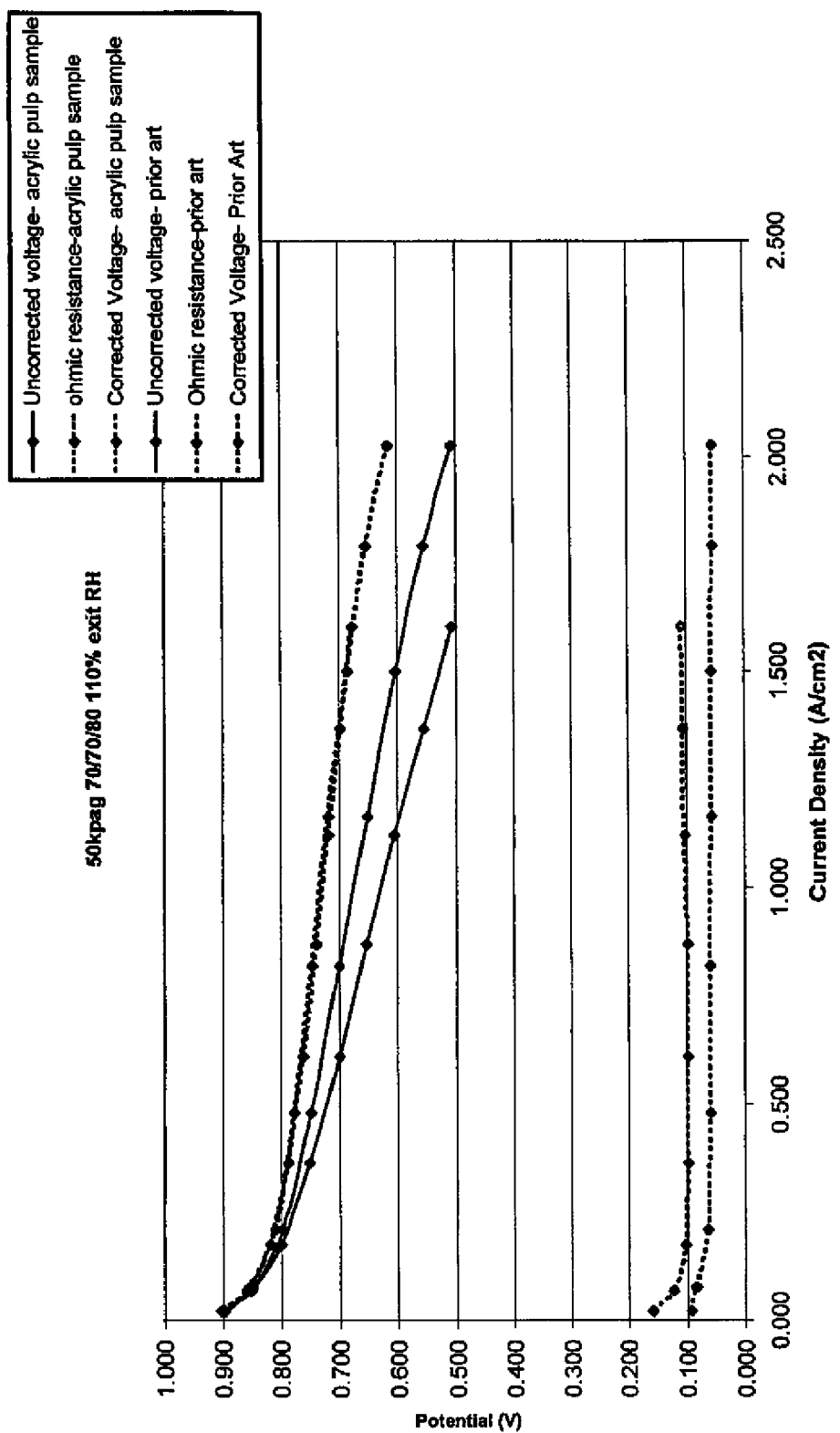
FIG. 4 is a graphical view of the potential versus current density characteristics under relatively mild conditions of a fuel cell sample containing a gas diffusion layer produced in accordance with the general teachings of the present invention.

To determine the functionality of the GDL produced in accordance with the general teachings of the present invention, the potential versus current density characteristics of a small scale (e.g., 50 cm$^2$) fuel cell was performed under two different sets of test conditions, as shown in FIGS. 3 and 4.

The first experiment was carried out to evaluate gas diffusion media performance under relatively wet conditions, and the polarization curves are shown in FIG. 3. The cell was operated under the following conditions: 60° C., 170 KPA gauge, 100% H$_2$ feed to anode at 2.0 stoichiometry, air feed to the cathode with 2.0 oxygen stoichiometry, and 60° C. dew point of feed streams. A second experiment, as shown in FIG. 4, was conducted under relatively mild conditions. Specifically, the cell was operated under the following conditions: 80° C., 50 KPA gauge, 100% H$_2$ feed to anode at 2.0 stoichiometry, air feed to the cathode with 2.0 oxygen stoichiometry, and 70° C. dew point of feed streams.

A conventional GDL, namely Toray TGPH 060 coated with a traditional MPL, was used to compare the performance of the GDL prepared in accordance with the general teachings of the present invention. As FIGS. 3 and 4 clearly show, the potential versus current density characteristics of the fuel cell samples having the GDLs produced in accordance with the general teachings of the present invention were quite satisfactory. As such, comparable fuel cell performance to state of art GDLs has been achieved by using GDL's prepared in accordance with the general teachings of the present invention.

The present invention provides many benefits over conventional GDL's including but not limited to: (1) a reduction in the number of high stress spots on the MEA during stack compression; (2) a reduction in the de-lamination of MPL from substrates; (3) the MPL and the carbon fiber mat are more strongly integrated together and provide consistent performance over time; (4) better freeze tolerance; and (5) a "stand alone" MPL is provided with reasonable mechanical properties.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for forming a gas diffusion layer for use in fuel cells, comprising:
   providing a fibrous mat having a plurality of interstices formed in a surface thereof;
   providing a plurality of pulp fibers;
   causing the plurality of pulp fibers to bloom;
   providing a microporous layer;
   combining the plurality of bloomed pulp fibers and the microporous layer to form a mixture; and
   disposing the mixture on the fibrous mat, wherein the pulp fibers are operable to penetrate the plurality of interstices and adhere to the fibrous mat, wherein the microporous layer is held in place by the plurality of pulp fibers.

2. The invention according to claim 1, wherein the microporous layer adheres to the plurality of pulp fibers.

3. The invention according to claim 1, wherein the fibrous mat is comprised of a carbon fibrous mat.

4. The invention according to claim 1, wherein the fibrous mat is comprised of electroconductive fibrillated materials.

5. The invention according to claim 1, wherein the fibrous mat has an areal weight of about 20 g/m$^2$ or less.

6. The invention according to claim 1, wherein the plurality of pulp fibers is comprised of a plurality of acrylic pulp fibers.

7. The invention according to claim 1, wherein microporous layer is comprised of an ink composition.

8. The invention according to claim 1, wherein the gas diffusion layer is incorporated into a proton exchange membrane fuel cell.

9. A method for forming a gas diffusion layer for use in fuel cells, comprising:
   providing a fibrous mat having a plurality of interstices formed in a surface thereof;
   providing a plurality of pulp fibers;
   disposing the pulp fibers on the fibrous mat, wherein the plurality of pulp fibers are caused to bloom prior to disposition on the fibrous mat, wherein the pulp fibers are operable to penetrate the plurality of interstices and adhere to the fibrous mat; and providing a microporous layer disposed on the fibrous mat, wherein the microporous layer is held in place by the plurality of pulp fibers.

10. The invention according to claim 9, wherein the microporous layer adheres to the plurality of pulp fibers.

11. The invention according to claim 9, wherein the microporous layer and the plurality of pulp fibers are combined prior to disposition on the fibrous mat.

12. The invention according to claim 9, wherein the fibrous mat is comprised of a carbon fibrous mat.

13. The invention according to claim 9, wherein the fibrous mat is comprised of electroconductive fibrillated materials.

14. The invention according to claim 9, wherein the fibrous mat has an areal weight of about 20 g/m² or less.

15. The invention according to claim 9, wherein the plurality of pulp fibers is comprised of a plurality of acrylic pulp fibers.

16. The invention according to claim 9, wherein microporous layer is comprised of an ink composition.

17. The invention according to claim 9, wherein the gas diffusion layer is incorporated into a proton exchange membrane fuel cell.

18. A gas diffusion layer for use in fuel cells, comprising:
a low areal weight fibrous mat;
a plurality of pulp fibers disposed on the fibrous mat, wherein the pulp fibers are caused to bloom prior to being disposed on the fibrous mat; and
a microporous layer disposed on the fibrous mat, wherein the microporous layer is held in place by the plurality of pulp fibers.

19. The invention according to claim 18, wherein the fibrous mat includes a plurality of interstices formed in a surface thereof.

20. The invention according to claim 19, wherein the pulp fibers are operable to penetrate the plurality of interstices and adhere to the fibrous mat.

21. The invention according to claim 18, wherein the fibrous mat is comprised of a carbon fibrous mat.

22. The invention according to claim 18, wherein the fibrous mat is comprised of electroconductive fibrillated materials.

23. The invention according to claim 18, wherein the fibrous mat has an areal weight of about 20 g/m² or less.

24. The invention according to claim 18, wherein the plurality of pulp fibers is comprised of a plurality of acrylic pulp fibers.

25. The invention according to claim 18, wherein microporous layer is comprised of an ink composition.

26. The invention according to claim 18, wherein the gas diffusion layer is incorporated into a proton exchange membrane fuel cell.

27. The invention according to claim 18, wherein the microporous layer adheres to the plurality of pulp fibers.

28. The invention according to claim 18, wherein the microporous layer and the plurality of pulp fibers are combined prior to disposition on the fibrous mat.

29. A gas diffusion layer for use in fuel cells, comprising:
a low areal weight fibrous mat, wherein the fibrous mat includes a plurality of interstices formed in a surface thereof;
a plurality of pulp fibers disposed on the fibrous mat, wherein the pulp fibers are caused to bloom prior to being disposed on the fibrous mat, wherein the pulp fibers are operable to penetrate the plurality of interstices and adhere to the fibrous mat; and
a microporous layer disposed on the fibrous mat, wherein the microporous layer is held in place by the plurality of pulp fibers, wherein the microporous layer is comprised of an ink composition.

30. The invention according to claim 29, wherein the fibrous mat is comprised of a carbon fibrous mat.

31. The invention according to claim 29, wherein the fibrous mat is comprised of electroconductive fibrillated materials.

32. The invention according to claim 29, wherein the fibrous mat has an areal weight of about 20 g/m² or less.

33. The invention according to claim 29, wherein the plurality of pulp fibers is comprised of a plurality of acrylic pulp fibers.

34. The invention according to claim 29, wherein the gas diffusion layer is incorporated into a proton exchange membrane fuel cell.

35. The invention according to claim 29, wherein the microporous layer adheres to the plurality of pulp fibers.

36. The invention according to claim 29, wherein the microporous layer and the plurality of pulp fibers are combined prior to disposition on the fibrous mat.

* * * * *